3,095,964
MEANS TO GUIDE A CONVEYOR BELT AROUND CORNERS

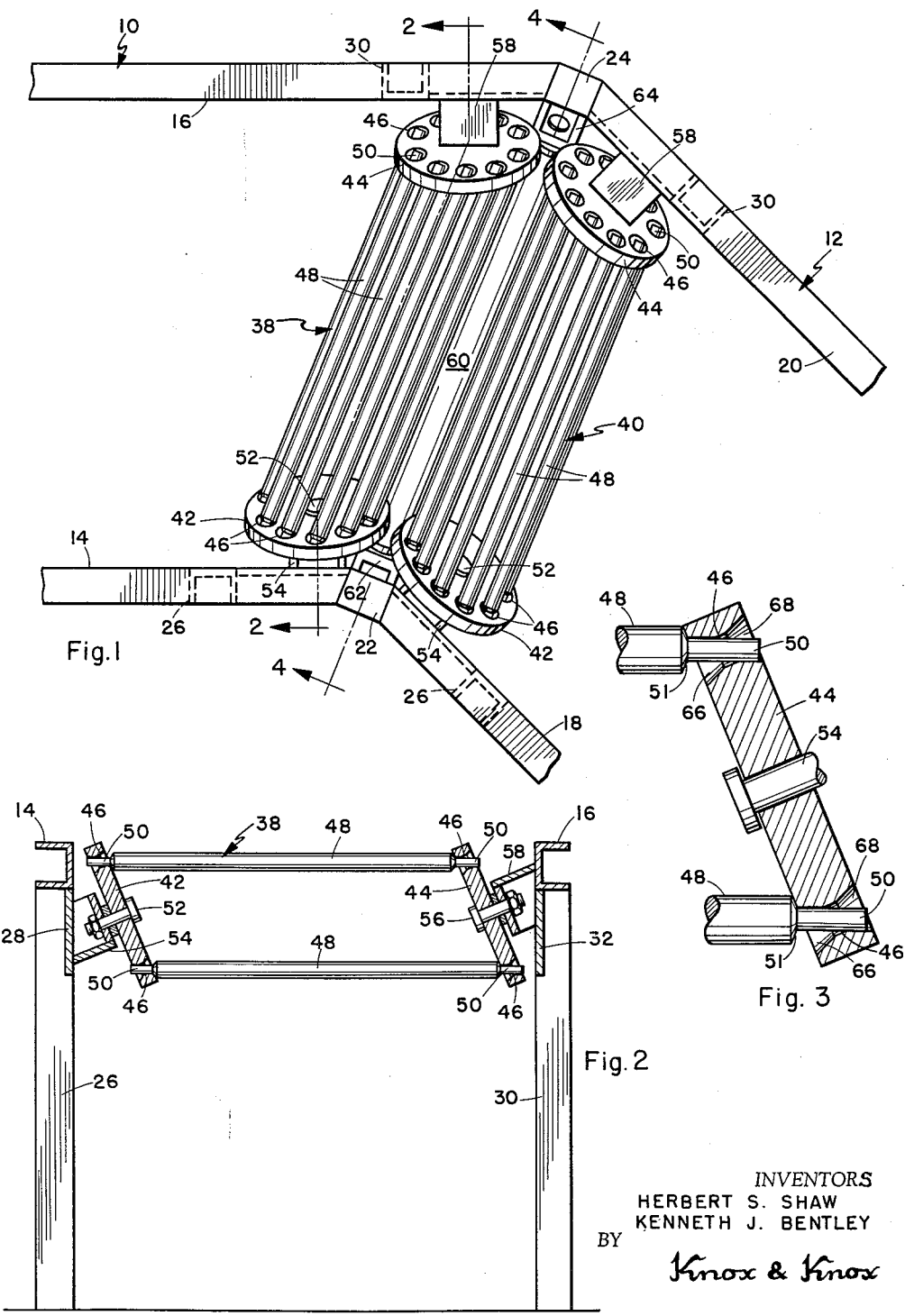

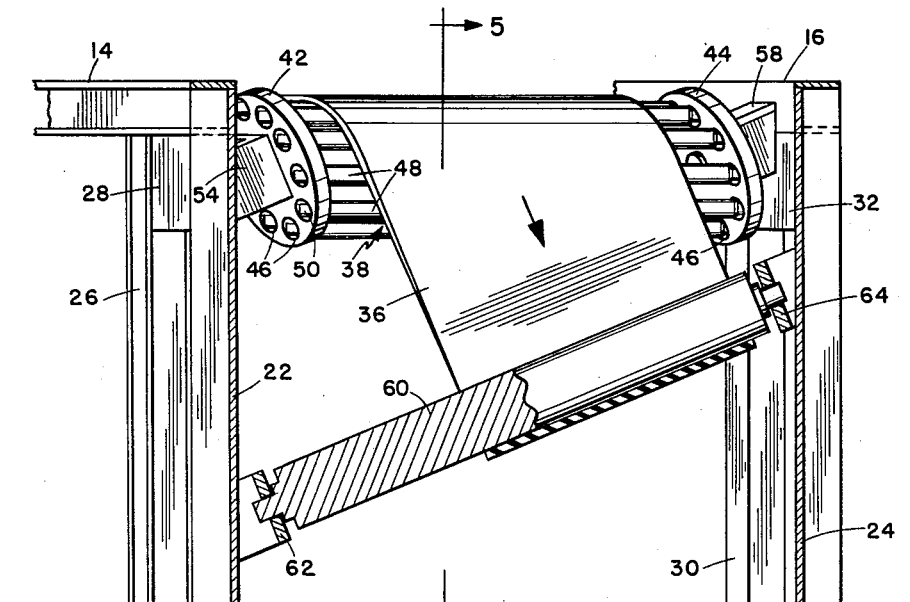
Fig. 4
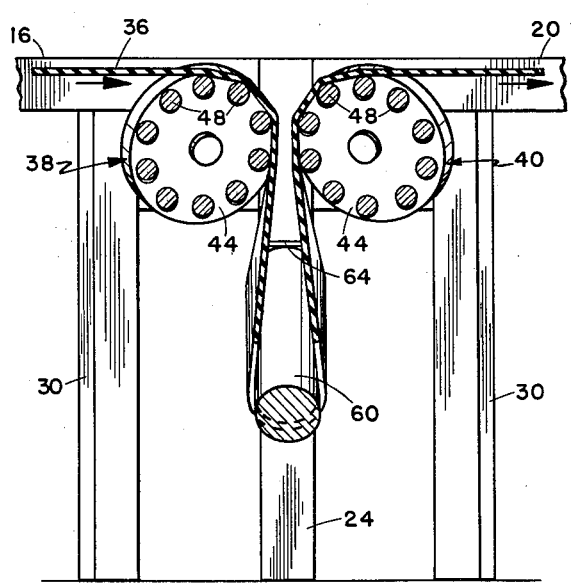
Fig. 5
Fig. 6
INVENTORS
HERBERT S. SHAW
KENNETH J. BENTLEY
BY
Knox & Knox

Herbert S. Shaw, La Mesa, Calif. (1526 Rideout Way, Whittier, Calif.), and Kenneth J. Bentley, 199 E. L St., Chula Vista, Calif.
Filed July 19, 1960, Ser. No. 43,788
7 Claims. (Cl. 198—184)

The present invention relates generally to conveyor belts and more particularly to means to guide a conveyor belt around corners.

The primary object of this invention is to provide guide means for a conveyor belt in which a flat continuous belt is passed over angularly disposed, compound rollers each having a plurality of belt supporting rods pivotally mounted at their ends to carry the belt around without side slip, the slack being taken up by a further angularly disposed idler roller.

Another object of this invention is to provide guide means in which each compound roller is a simple assembly of two end discs with rods pivotally connected therebetween, the disc being angularly offset from the plane of the conveyor belt and mounted on parallel axes which are spaced along the plane of the belt.

Another object of this invention is to provide guide means wherein rotation of one end disc relative to the other, which would result in twisting of the compound roller, is prevented by the design of the pivotal attachment of the rods to the discs.

A further object of this invention is to provide conveyor belt guide means which can be built in many different sizes and load capacities and which may be assembled in a variety of complex loops or other configurations.

Finally, it is an object to provide a conveyor belt guide means of the aforementioned character which is simple and convenient to manufacture and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a top plan view of a corner assembly, the belt being omitted for clarity;

FIGURE 2 is a sectional view taken on the line 2—2 of FIGURE 1;

FIGURE 3 is an enlarged fragmentary sectional view, similar to a portion of FIGURE 2, showing the detail of one end of a compound roller;

FIGURE 4 is a sectional view taken on the line 4—4 of FIGURE 1;

FIGURE 5 is a sectional view taken on the line 5—5 of FIGURE 4; and

FIGURE 6 is a diagrammatic top plan view of several corner units arranged to provide multiple directional changes.

Similar characters of reference indicate similar or identical elements and portions throughout the specification and throughout the views of the drawing.

The structure includes a rigid supporting frame defining a corner and having an entry portion 10 and an exit portion 12. The entry portion 10 has an inner top rail 14 and an outer top rail 16, while the exit portion has an inner top rail 18 and an outer top rail 20, said inner rails being joined at an inner corner post 22 and the outer rails joined at an outer corner post 24. The inner rails 14 and 18 are further supported by uprights 26 on either side of the corner post 22 and mounting plates 28 are fixed below said rails between each upright and the corner post. Similarly, the outer rails 16 and 20 are supported by uprights 30 with mounting plates 32 fixed below the rails between said uprights and the corner post 24. The structure as illustrated is merely one example of a suitable arrangement and the details may vary considerably according to space and strength requirements, the rails extending as far as necessary and following the path of the conveyor belt.

The belt, indicated generally by the numeral 36, is supported at the corner by a pair of compound rollers 38 and 40, the roller 38 being mounted at the end of the entry portion 10 and the roller 40 at the beginning of the exit portion 12, said compound rollers being identical in structure. The compound roller 38 comprises a pair of end discs 42 and 44 each having a plurality of open sockets 46 spaced circumferentially at a constant radius from the axis. Connecting the end discs 42 and 44 are a plurality of circular rods 48 having reduced diameter spindles 50 at the ends which seat in the sockets 46. The compound roller 38 is mounted with the rods 48 extending horizontally, the end disc 42 being rotatably mounted on a stud 52 carried by a bracket 54, which is fixed to the mounting plate 28. The end disc 44 is rotatably mounted on a stud 56 carried by a further bracket 58, which is fixed to the mounting plate 32 and rail 16, as in FIGURE 2. The studs 52 and 56 are inclined on parallel axes so that the end discs 42 and 44 are angularly disposed from the vertical, the rods 48 in the lower portion of the end discs being displaced outwardly, or toward the outer corner, from those in the upper portion. The end discs 42 and 44 thus rotate about fixed axes in inclined planes and impart an axial motion to the rods 48 in addition to the rotation.

The compound roller 38 is further angularly disposed in the plane of the belt, or the horizontal plane by offsetting the brackets 54 and 58 so that the rods 48 are canted across the belt at an angle substantially equal to half the total angle of turn through the corner. Thus the rotational axes of the ends of compound roller 38 are parallel, but are horizontally staggered and offset angularly in vertical planes.

The compound roller 40 is mounted in a similar manner between further brackets 54 and 58 in the exit portion 12 and is parallel to the compound roller 38, the two being closely spaced to reduce clearance to a minimum. While the compound roller 38 turns the belt 36 through the first half of the angle of turn, the compound roller 40 turns the belt through the second half of the angle of turn.

The belt 36 dips downwardly between the compound rollers 38 and 40 and passes under an idler roller 60, freely rotatably mounted in bearing brackets 62 and 64 fixed to the corner posts 22 and 24, respectively. Due to the turn, the inner portion of the belt 36 has considerably more slack than the outer portion, the idler roller 60 being angularly disposed with the inner end lower than the outer end thereof to take up the additional length of belt, as in FIGURE 4.

In turning around the angled compound rollers 38 and 40, the belt 36 is directed to the outside of the corner and rides under the outer portion of the idler roller 60, the axis of which is parallel to the transverse plane of the depending portion of the belt. The angular change of direction of the belt over a roller has been the cause of most of the difficulties in building a corner guide means. When using a conventional solid roller mounted on an axis which is angularly disposed in the plane of the belt, a given point on the roller moves in an arcuate path in a plane normal to the shaft axis, while a point on the belt, initially in contact with the given point on the roller, moves in an angularly disposed path relative to the roller axis. There is thus a motion of the belt axially of the roller, resulting in slippage which causes creeping of the belt and misalignment, if not ultimate jamming.

In the structure illustrated, the effective surface of each compound roller, represented by the surfaces of the rods 48, is made to move axially corresponding to the generally helical path of the belt around the roller, in other words, as the belt 36 travels downwardly and outwardly around the compound roller 38, any given point on any rod 48 in contact with the belt follows the true motion of the belt and slippage is eliminated. Similarly, the upward and inward motion of the belt around compound roller 40 in the second part of the turn is guided by an upward and inward motion of the rods 48 in contact therewith, so ensuring accurate tracking of the belt.

The pivotal connections of rods 48 to the end discs 42 and 44 must accommodate rotary motion of each rod axis in a generally conical path, the rods remaining parallel and horizontal while the end discs rotate in a compound angular plane relative to the rods, thus each socket 46 is provided with a tapered or conical inner portion 66 and a corresponding conical outer portion 68. This is best illustrated in FIGURE 3, where it may be seen that the conical portions 66 and 68 provide clearance for the swing of the spindles 50 in moving from the upper to the lower position, or vice versa, the pivotal connection being substantially a universal coupling. Since the physical connection between end discs 42 and 44 is limited to the rods 48, which are pivotally held at each end and it would appear that one end disc could turn relative to the other, causing the rods to twist. It has been found, however, that by making the angle of taper of the conical portions 66 and 68 closely equal to the angle of swing of the rod axes, so that the spindles 50 are held firmly without play, yet are free to rotate, the close fit of all the spindles 50 in their sockets 46 being sufficient to prevent any twisting of the compound rollers. In addition, the ends of rods 48, at their transition to the spindles 50, are provided with bevelled shoulders 51 cut at an angle corresponding to the angle of end discs 42 and 44 relative to the axes of said rods, the bevelled shoulders bearing against the faces of the end discs and adding to stability.

For example, in turning a belt through an angle of 45 degrees, as illustrated in the drawings, each compound roller is disposed horizontally at an angle of 22½ degrees relative to the direction of travel of the belt adjacent the particular roller. In addition, the end discs 42 and 44 are inclined from the vertical at an angle which theoretically should also be 22½ degrees, but, to ensure proper belt tracking and to overcompensate very slightly for slippage under heavy driving load, is preferably about 24 degrees. The resultant of these angles produces a conical swing of the spindles 50 around the reference axis at an angle of 31 degrees 20 minutes and the conical portions 66 and 68 are, therefore, cut at this angle. The 45 degree turn is merely an example and various other angles of turn may be arranged, although turns of much more than 45 degrees may be subject to structural difficulties.

By combining several corner assemblies, as in FIG. 6, a continuous belt may be carried over virtually any path through many changes of angle, with the working surface of the belt remaining flat at all times. By reducing the diameter of the compound rollers, the gap at each turn can be reduced to a minimum for handling small articles. The actual size of the compound rollers and their rods will, of course, be dependent on the load to be carried, but articles are usually of a size commensurate with their weight and able to bridge the small gap between the rollers.

Auxiliary rollers for supporting the straight stretches of belt and means for driving the belt have been omitted, various configurations for such being well known in the art. In a continuous belt system, the return run may be made directly beneath the conveyor run by using duplicate corner assemblies, the lower assemblies being inverted with the idler rollers above the compound rollers, but otherwise identical.

While simple spindle in socket means is indicated for connecting the rods 48 to the end discs 42 and 44 it may be feasible to use universal couplings of suitable type.

The structure facilitates the conveyance of articles or material over complex paths without the need for groups of tapered direction changing rollers, which are usually driven and, by using a single continuous belt, ensures constant speed at all positions.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

We claim:

1. A belt assembly with means to guide a belt around a corner, comprising: a supporting frame defining a corner structure having an entry portion and an exit portion; a first compound roller rotatably mounted in said entry portion; a second compound roller rotatably mounted in said exit portion; an idler roller freely rotatably mounted in offset relation to and effectively between said compound rollers; a flexible belt supported on and passing between said compound rollers and around said idler roller; each of said compound rollers including a pair of end discs, each having its axis extending transversely of and dipped at an acute angle relative to the general plane of that portion of the belt in the adjacent one of said entry and exit portions, and a plurality of belt supporting rods parallel to said plane and staggered at an acute angle transversely of said portion of the belt; said belt supporting rods extending between said end discs and being universally pivotally attached at their ends to said end discs; any given point on one of said compound rollers in contact with said belt moving in an arcuate path in a plane inclined outwardly of the corner structure and parallel to said general plane, whereby axial slippage of said belt on the compound roller is prevented.

2. A belt assembly according to claim 1 and including means for positively preventing unequal rotation of said discs.

3. A belt assembly with means to guide a belt around a corner, comprising: a supporting frame defining a corner structure having an entry portion and an exit portion; a first compound roller rotatably mounted in said entry portion; a second compound roller rotatably mounted in said exit portion; an idler roller freely rotatably mounted in offset relation to and effectively between said compound rollers; a flexible belt supported on and passing between said compound rollers and around said idler roller; each of said compound rollers including a pair of end discs; a plurality of belt supporting rods terminally universally pivotally connected to said end discs, when the belt is horizontal, and extending substantially horizontally beneath said belt; said end discs being inclined to the vertical and rotatable on parallel axes laterally staggered transversey of the belt; said rods being angularly disposed to the direction of belt travel at an angle substantially equal to half the total angle of turn; said idler roller being angularly disposed to take up the slack in said belt between said compound rollers; the rotation of said inclined and staggered end discs imparting an axial motion to said rods and any given point on one of said compound rollers in contact with said belt moving in a susbtantially arcuate path in a plane angularly disposed outwardly of the corner structure and downwardly from said general plane of the belt and follows the belt in motion around the compound roller to prevent slippage.

4. A belt assembly with means to guide a belt around a corner, comprising: a supporting frame defining a corner structure having an entry portion and an exit portion; a first compound roller rotatably mounted in said entry portion; a second compound roller rotatably mounted in said exit portion; an idler roller freely rotatably mounted in offset relation to and effectively between said compound rollers; a flexible belt supported on and passing between said compound rollers and around said idler roller; each of said compound rollers including a pair of end discs; a plurality of belt supporting rods terminally pivotally connected to said end discs, when the belt is horizontal, and extending substantially horizontally beneath said belt; said end discs being inclined to the vertical and rotatable on parallel axes laterally staggered transversely of the belt; said rods being angularly disposed to the direction of belt travel at an angle substantially equal to half the total angle of turn; said end discs having sockets in which said rods are terminally seated; said sockets having generally concial mouth portions containing a bevel angle corresponding to the angular motion of said rods relative to said end discs to stabilize the connection of the rods and discs; said idler roller being angularly disposed to take up the slack in said belt between said compound rollers; the rotation of said inclined and staggered end discs imparting an axial motion to said rods and any given point on one of said compound rollers in contact with said belt moving in a substantially arcuate path in a plane angularly disposed outwardly of the corner structure and downwardly from said general plane of the belt and follows the belt in motion around the compound roller to prevent slippage.

5. A belt assembly with means to guide a belt around a corner, comprising: a supporting frame defining a corner structure having an entry portion and an exit portion; a first compound roller rotatably mounted in said entry portion; a second compound roller rotatably mounted in said exit portion; and idler roller freely rotatably mounted in offset relation to and effectively between said compound rollers; a flexible belt supported on and passing between said compound rollers and around said idler roller; each of said compound rollers including a pair of end discs, each having its axis extending transversely of and dipped at an acute angle relative to the general plane of that portion of the belt in the adjacent one of said entry and exit portions, and a plurality of belt supporting rods parallel to said plane and staggered at an acute angle transversely of said portion of the belt; said belt supporting rods extending between said end discs and being universally pivotally attached at their ends to said end discs; any given point on one of said compound rollers in contact with said belt moving in an arcuate path in a plane inclined outwardly of the corner structure and parallel to said general plane, whereby axial slippage of said belt on the compound roller is prevented; means for positively preventing unequal rotation of said discs; said means including journals of reduced size on the ends of said rods defining shoulders at the inner ends of said journals, said discs having sockets with conical mouth portions defining surfaces against which said journals rest.

6. A belt assembly according to claim 5 wherein said sockets have recticylindrical portions disposed centrally between said conical mouth portions.

7. A belt assembly according to claim 5 wherein said shoulders are bevelled at an angle corresponding to the angle of the adjacent face of each disc relative to the axes of said rods, whereby said bevelled shoulders bear on the disc faces and stabilize the connection therebetween.

References Cited in the file of this patent

UNITED STATES PATENTS

| | | |
|---|---|---|
| 2,681,543 | Rickey | June 22, 1954 |
| 2,798,590 | Raskin | July 9, 1957 |